United States Patent
Shiba

[11] Patent Number: 5,644,439
[45] Date of Patent: Jul. 1, 1997

[54] MOUNTING EQUIPMENT USED FOR AN OBJECT HAVING A HOLLOW PORTION OF CIRCULAR CROSS SECTION

[75] Inventor: Kenzo Shiba, Osaka, Japan

[73] Assignee: Cateye Co., Ltd., Osaka, Japan

[21] Appl. No.: 598,663

[22] Filed: Feb. 8, 1996

[30] Foreign Application Priority Data

Feb. 14, 1995 [JP] Japan .................. 7-024988

[51] Int. Cl.$^6$ .................. G02B 7/02
[52] U.S. Cl. .................. 359/819; 359/842; 359/527
[58] Field of Search .................. 359/819, 842, 359/844, 848, 849, 515, 527

[56] References Cited

U.S. PATENT DOCUMENTS

| | | | |
|---|---|---|---|
| 4,135,788 | 1/1979 | Sargis | 359/842 |
| 4,136,466 | 1/1979 | Wrue | 359/819 |
| 4,183,622 | 1/1980 | Malgarin | 359/527 |
| 4,380,369 | 4/1983 | Schacht | 359/842 |
| 4,445,228 | 4/1984 | Bruni | 359/842 |
| 4,715,681 | 12/1987 | Johnson | 359/842 |
| 5,291,336 | 3/1994 | Miles | 359/819 |
| 5,339,193 | 8/1994 | Korpert et al. | 359/819 |
| 5,463,502 | 10/1995 | Savage, Jr. | 359/819 |

FOREIGN PATENT DOCUMENTS

| | | |
|---|---|---|
| 2401822 | 3/1979 | France . |
| 877760 | 9/1961 | United Kingdom . |
| 888178 | 1/1962 | United Kingdom . |

*Primary Examiner*—Loha Ben
*Attorney, Agent, or Firm*—Banner & Witcoff, Ltd.

[57] ABSTRACT

A mounting equipment for mounting an object on a mount base component having a hollow portion of approximately circular cross section, which is less susceptible to damage and requires smaller number of parts, includes a expandable nut, a shaft portion to be engaged with the object, and a nut and a screw for drawing the expandable nut and shaft portion close to each other. When the screw is turned with the equipment inserted to the inside of the cylindrical component, the expandable nut and the shaft portion are drawn close to each other, and the shaft portion is inserted to expandable nut so that expandable nut is expanded outward. Thus, part of the expandable nut is brought into pressure contact with an inner wall of the cylindrical component, and hence object is mounted onto the cylindrical component.

7 Claims, 9 Drawing Sheets

MOUNTING EQUIPMENT USED FOR AN OBJECT HAVING A HOLLOW PORTION OF CIRCULAR CROSS SECTION

BACKGROUND OF THE INVENTION

1. Field of the Invention

The present invention relates to a mounting equipment for mounting an object on a circular hole. More specifically, the present invention relates to a mounting equipment for mounting and fixing a component for a two-wheeled vehicle, such as a rear view mirror onto an end portion of a pipe shape handle bar or the like.

2. Description of the Background Art

A mounting equipment for fixing a rear view mirror or the like on an end portion of a pipe shaped handle bar or the like of a bicycle has been known. FIG. 9 is an exploded perspective view showing the conventional mounting equipment.

Referring to the figure, the mounting equipment is used for fixing a mirror 15 which is integral with a stay portion 13 on an end portion of a pipe shaped handle bar 7 of a bicycle. The mounting equipment is inserted into handle bar 7, and the equipment includes a tapered nut 33 having its outer surface tapered, a shaft 31 having a cylindrical shape with slits, which expands when it receives at its hollow portion the tapered nut 33, and a screw 11 which fits in tapered nut 33 for engaging shaft 31 and tapered nut 33 which have been drawn into contact. Shaft 31 is formed integral with stay portion 13.

FIG. 10 is a perspective view showing appearance of shaft 31 shown in FIG. 9. Referring to the figure, shaft 31 has a cylindrical shape, and has slits 17a to 17d at a side to be engaged with the tapered nut 33. At portions sectioned by slits 17a to 17d, plates 35a to 35d having arcuate cross section (hereinafter referred to as arcuate plates) result.

FIG. 11 is a perspective view showing an appearance of tapered nut 33 shown in FIG. 9.

Referring to the figure, tapered nut 33 has a tapered shape, that is, it has smaller diameter at a side to be engaged with shaft 31, and larger diameter at the opposite side. Further, tapered nut 33 is provided with rotation inhibiting projections 37a and 37b which are engaged with slits 17a and 17c or slits 17b and 17d of shaft 31 shown in FIG. 10 for inhibiting relative rotation of tapered nut 33 and shaft 31.

Further, there is provided a tapped hole 43 for engagement with screw 11 axially through tapered nut 33 along the direction of extension of shaft 31.

Mirror 15 integral with stay portion 13 is mounted on handle bar 7 by the mounting equipment in the following manner.

Referring to FIG. 9, first, tapered nut 33 and shaft 31 are engaged by means of screw 11, with rotation inhibiting projections 37a and 37b of tapered nut 33 engaged with slits 17a and 17c or 17b and 17d of shaft 31. In this state, the mounting equipment consisting of tapered nut 33 and shaft 31 is inserted into handle bar 7. FIG. 12 shows a cross section taken along the line X—X in this state. Here, tapered nut 33 is simply in contact with arcuate plates 35 of shaft 31, and the shape of the arcuate plates 35 of shaft 31 is not deformed.

From this state, screw 11 is screwed in, so that tapered nut 33 is pushed into shaft 31, and at the same time arcuate plates 35 of shaft 31 are pushed and expanded by tapered nut 33. Consequently, tapered nut 33, arcuate plates 35 and inner portion of handle bar 7 are brought into contact with each other, whereby stay portion 13 and handle bar 7 are firmly engaged.

However, the conventional mounting equipment has a disadvantage that it is susceptible to damage, from reasons described in the following.

FIG. 14 is a cross sectional view taken along the line Y—Y of shaft 31 shown in FIG. 9.

As it is apparent from the figure, shaft 31 has a discontinuous circular cross section as there are slits 17a to 17d. Further, since it must be deformed as the tapered nut 33 is inserted therein, it is made unavoidably thin, that is, it has small cross sectional area. Therefore, shaft 31 does not have high strength.

Referring to FIG. 13, with the screw 11 fully screwed, shaft 31 comes into contact with the inside of handle bar 7 at the tip ends of arcuate plates 35. Therefore, when one grabs or touches stay portion 13 while he or she is riding on the bicycle and a torque as an external force is applied to shaft 31 with screw 11 serving as axial core, there would be torsional moment acting on arcuate plates 35. This torsional moment causes breakage or damage of shaft 31 which has small cross sectional area as described above.

In order to prevent such damage, there are two possible methods. Namely, a method in which the screw is fastened loose so as to easily allow sliding rotation of the inside of the handle bar with respect to the outer side of the shaft, and a method in which a mechanism dividing the stay portion and shaft portion by separate parts so that even when torque is applied to the stay portion, only the stay portion rotates and the torque is not transmitted to the shaft portion, is incorporated in the mounting equipment. However, no matter which method is employed, when one happens to touch the stay portion or the like while he or she is riding on the bicycle, the mirror is displaced easily, which is not convenient for use. In this case, it goes without saying that it is impossible to drive the bicycle while gripping the stay portion 13. If the latter method is employed, it is necessary to separately prepare and incorporate the mechanism allowing rotation of the stay portion only. Therefore, the number of parts is increased, and hence the cost is increased.

The present invention was made to solve the above described problems and its object is to provide a mounting apparatus which requires a smaller number of parts, and is less susceptible to damage.

The mounting equipment in accordance with the present invention is for mounting an object on a mount base component having a hollow portion of approximately circular cross section, which equipment includes a first bar shaped mounting part to be connected to the object to be mounted; a second mounting part having a tip end of such a shape that covers at least an end portion of the first mounting part, to be engaged with the first mounting part with tip end expanded conforming to an outer shape of the first mounting part as it is drawn closer to the first mounting part; a drawing part capable of drawing the first and second mounting parts relative to each other; wherein first and second mounting parts in mutually engaged state are inserted to the hollow portion of the mount base component, and the drawing part is activated so that tip end of the second mounting part is pressed against the inner wall of the hollow portion of the mounting base component.

In the mounting equipment in accordance with the present invention, the first and second mounting parts in mutually engaged state are inserted to the hollow portion of the mount base component, and the first and second mounting parts are drawn close to each other by the drawing parts. Therefore, the tip end of the second mounting part is expanded conforming to the outer shape of the first mounting part, and the tip end of the second mounting part is pressed against the inner wall of the hollow portion of the mount base component. Therefore, the equipment can be made durable and less susceptible to damages.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
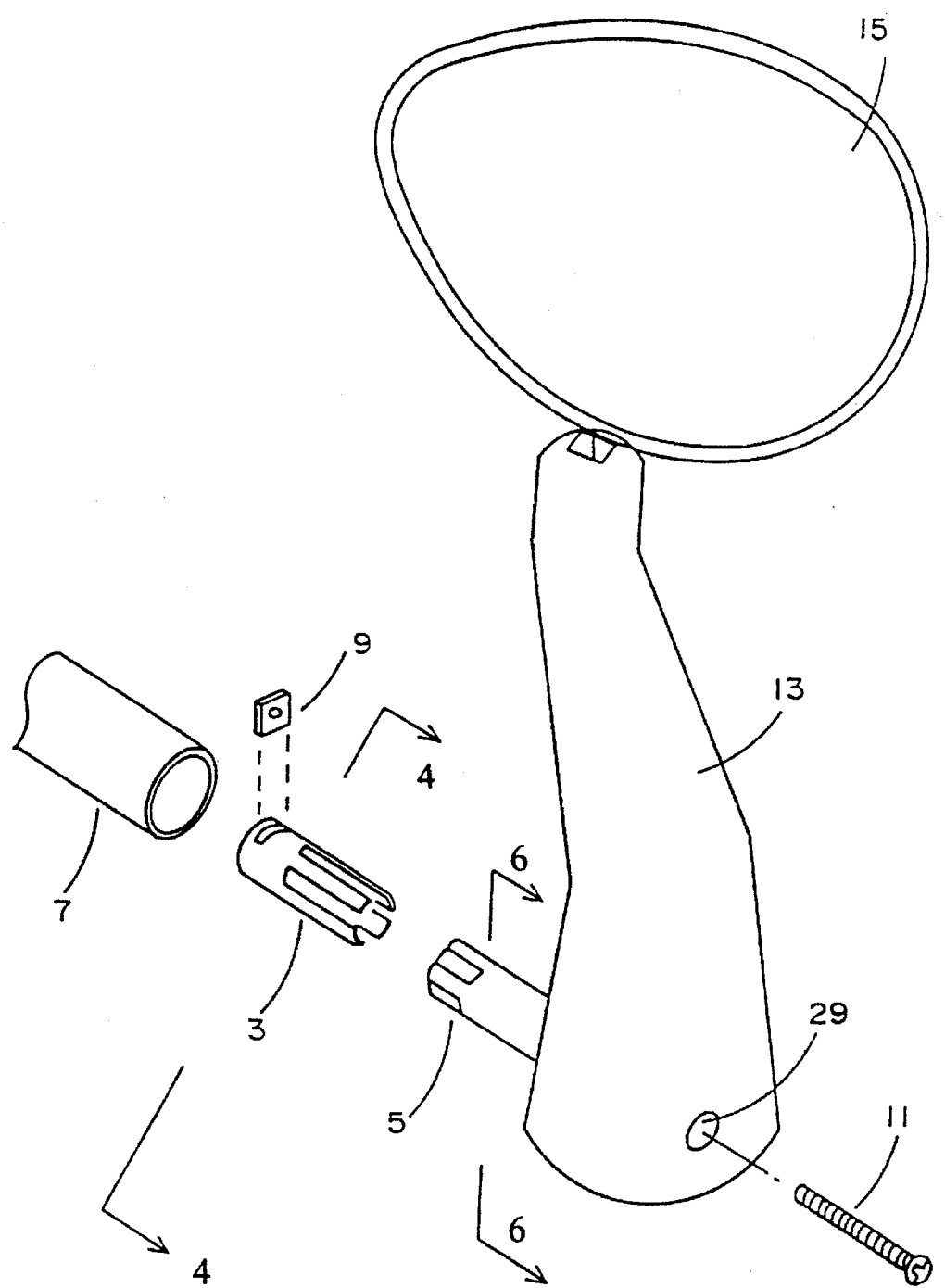
FIG. 1 is an exploded perspective view showing how mirror 15 having stay portion 13 is mounted on handle bar 7 by the mounting equipment in accordance with a first embodiment of the present invention.

Referring to FIG. 1, mirror 15 having stay portion 13 is mounted onto a handle bar 7 of a bicycle by means of the mounting equipment. The mounting equipment is constituted by a shaft portion 5 which is integrally formed with stay portion 13, an expandable nut 3 which expands as shaft portion 5 is pushed therein, a nut 9 secured in expandable nut 3, and a screw 11 which is fitted to nut 9 through stay portion 13, shaft portion 5 and expandable nut 3.

Figure 2:
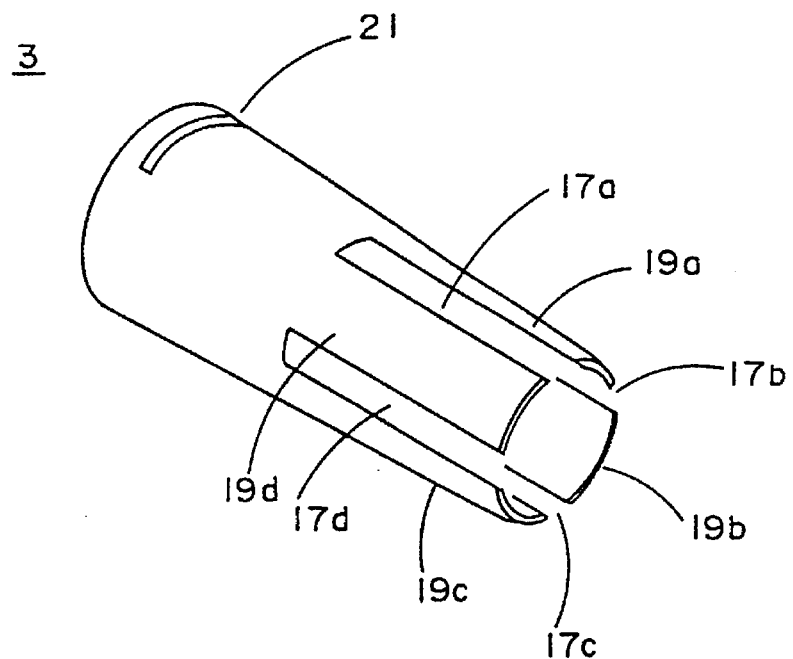
FIG. 2 is a perspective view showing a specific structure of an expandable nut 3 shown in FIG. 1.

FIG. 2 is a perspective view showing specific structure of expandable nut 3 shown in FIG. 1.

Referring to the figure, expandable nut 3 has a nut fitting hole 21 for securing nut 9. Expandable nut 3 has slits 17a to 17d on a side to be engaged with shaft portion 5, and at portions sectioned by the slits, arcuate plates 19a to 19d results. Thickness of each of the arcuate plates 19a to 19d is made thinner toward the side to be engaged with shaft portion 5 and thicker toward the roots of the arcuate plates 19a to 19d, respectively.

Figure 3:
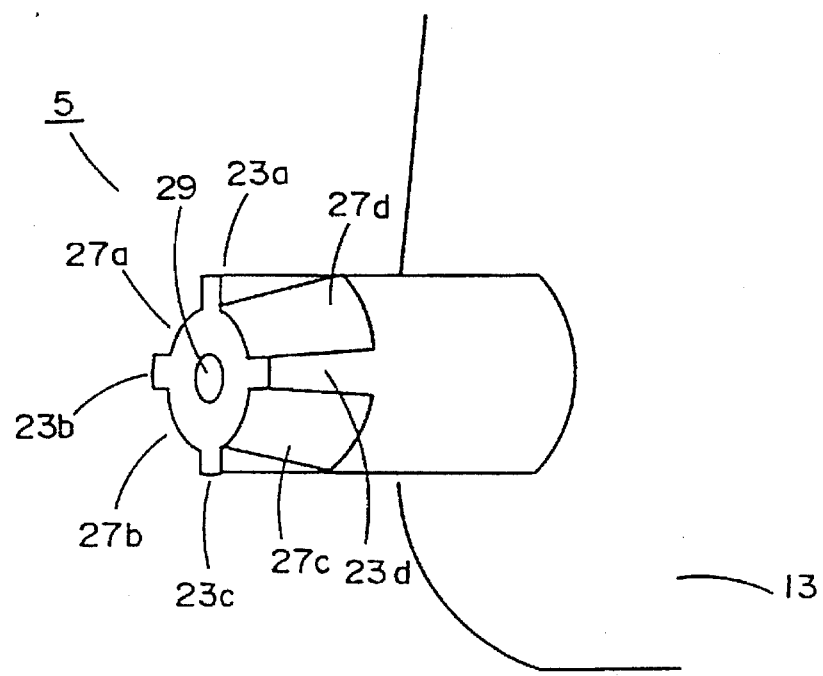
FIG. 3 is a perspective view showing a specific structure of a shaft portion 5 of FIG. 1.

FIG. 3 is a perspective view showing a specific structure of shaft portion 5.

Referring to the figure, shaft portion 5 is formed integrally with stay portion 13. Shaft portion 5 has tapered portions 27a to 27d which are tapered from the side of stay portion 13 toward the tip end. In addition, shaft portion 5 has rotation inhibiting projections 23a to 23b arranged to be engaged with slits 17a to 17d of expandable nut 3, respectively. As slits 17a to 17d are engaged with rotation inhibiting projections 23a to 23d, respectively, rotation of expandable nut 3 and shaft portion 5 relative to each other can be prevented, and hence idle turning of the screw can be prevented.

How mirror 15 having stay portion 13 is actually mounted onto handle bar 7 by the mounting equipment shown in FIG. 1 will be described in the following.

Figure 4:
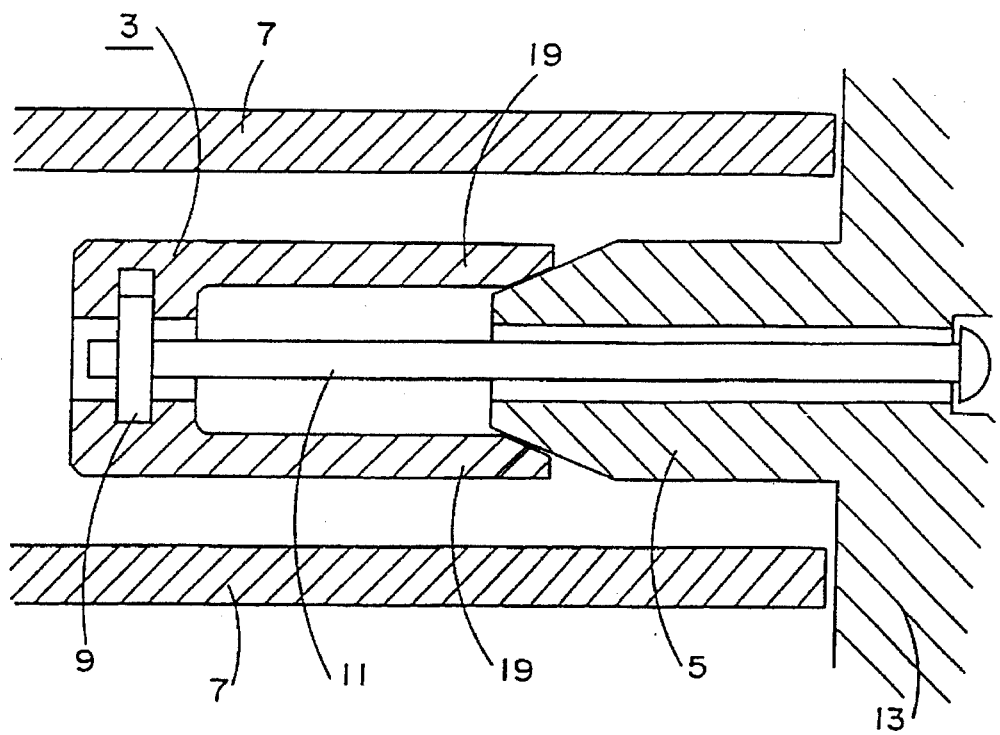
FIG. 4 is a cross section taken along the line 4—4 of FIG. 1 with all parts engaged.
Figure 5:
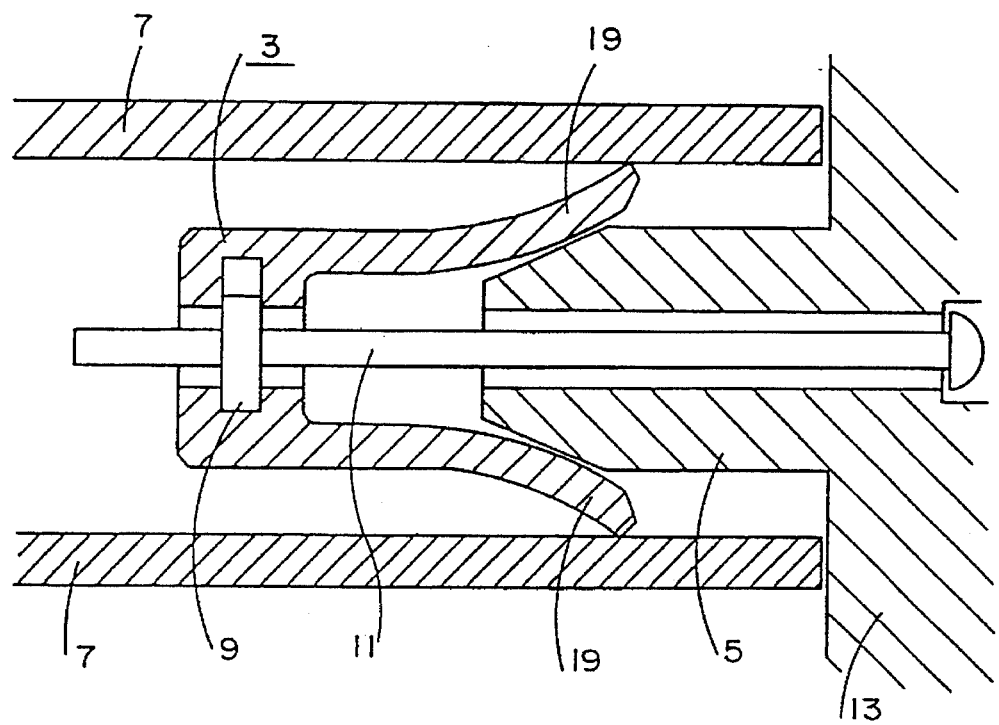
FIG. 5 is a cross sectional view taken along the line 4—4 showing a state in which mirror 15 having stay portion 13 is fixed on handle bar 7 by fastening the screw from the state of FIG. 4.

FIG. 4 is a cross sectional view taken along the line 4—4 shown of a state in which all parts shown in FIG. 1 are engaged and the mounting equipment is inserted to handle bar 7. FIG. 5 is a cross sectional view taken along the line 4—4 showing a state in which mirror 15 having stay portion 13 is fixed in handle bar 7 by fastening the screw from the state of FIG. 4.

Referring to FIG. 4, before stay portion 13 is mounted on handle bar 7 by the mounting equipment, expandable nut 3 and shaft portion 5 formed integrally with stay portion 13 are engaged by means of screw 11 and nut 9. However, in this state, handle bar 7 is not in contact with expandable nut 3, and stay portion 13 is not engaged with handle bar 7.

When screw 11 is fastened from the state of FIG. 4, expandable nut 3 is drawn toward shaft portion 5 as shown in FIG. 5. Consequently, expandable nut 3 moves to cover shaft portion 5, and at the same time, the arcuate plates 19 of expandable nut 3 are pressed and expanded. Thus shaft portion 5, arcuate plates 19 and the inner portion of handle bar are brought into pressure contact with each other and hence stay portion 13 and handle bar are firmly engaged.

Referring to FIG. 5, assume that a torque as an external force is applied to shaft portion 5 through stay portion 13 with the screw 11 serving as an axis, in the state in which stay portion 13 is mounted on handle bar 7 by means of the mounting equipment. The torque is transmitted through shaft portion 5 to arcuate plates 19 of expandable nut 3. However, at the same time, the torque is transmitted to that side of expandable nut 3 which does not engage with shaft portion 5 to the same amount, through screw 11 and nut 9. Therefore, there is not a torsional moment generated at the arcuate portion 19 of expandable nut 3, and therefore unlike the conventional mounting equipment, the equipment in accordance with the present embodiment does not suffer from any damage.

Figure 6:
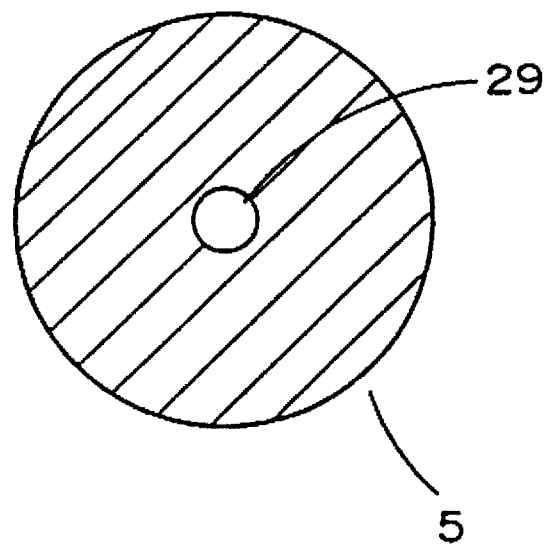
FIG. 6 is a cross section taken along the line 6—6 of shaft portion 5 shown in FIG. 1.

Further, referring to the cross section taken along the line 6—6 of shaft portion 5 shown in FIG. 1, there is provided a tapped hole 29 as shown in FIG. 6, different from the conventional equipment. The shaft portion 5 need not be deformed, and hence it can be formed as a thick continuous cylinder. Therefore, shaft portion 5 has sufficiently high torsion strength and it is less susceptible to damage. Therefore, when the inner portion of handle bar 7 and expandable nut 3 engaged with shaft portion 5 by sufficient fastening of screw 11 are firmly fixed by pressure contact, the stay portion 13 is never displaced even when a force is applied thereto, and hence it is possible to drive the bicycle while gripping stay portion 13.

Figure 7:
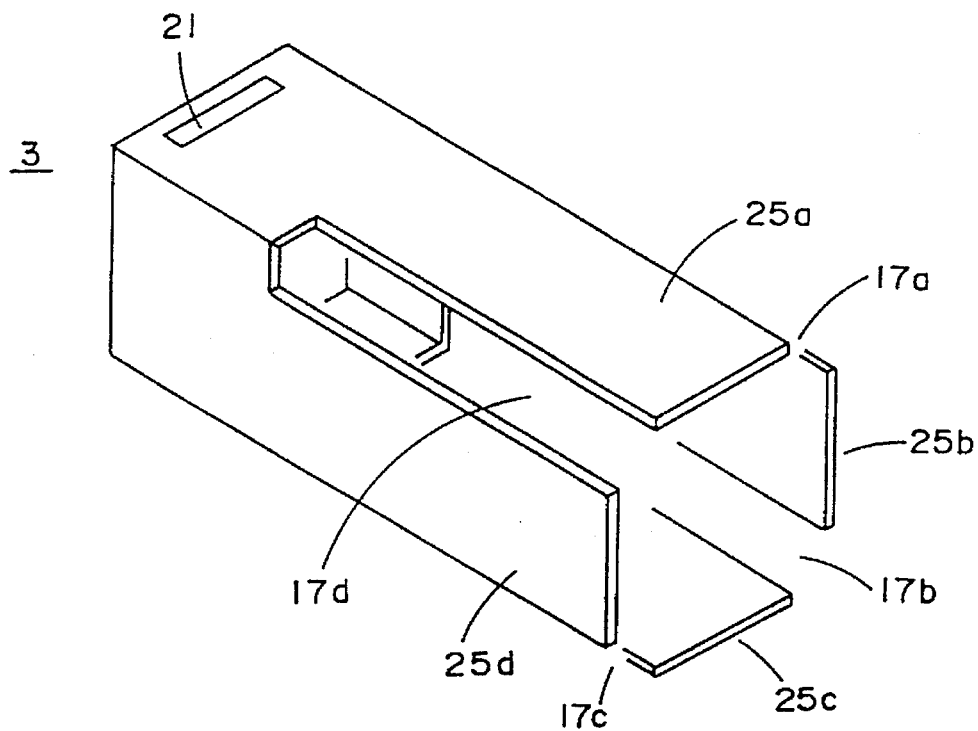
FIG. 7 is a perspective view showing an appearance of an expandable nut of the mounting equipment in accordance with a second embodiment of the present invention.
Figure 8:
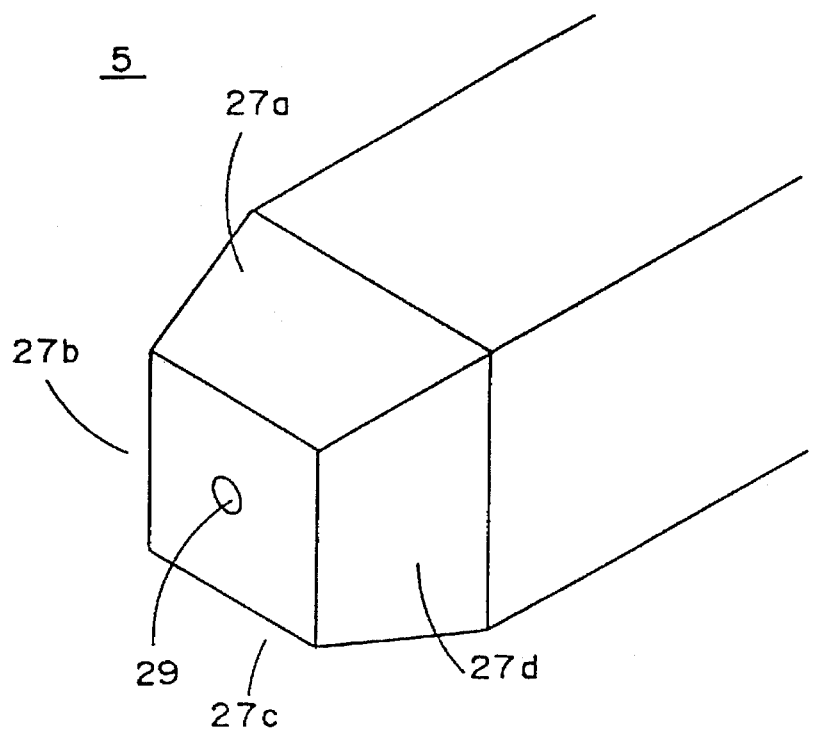
FIG. 8 is a perspective view showing appearance of a shaft portion of a mounting equipment in accordance with the second embodiment of the present invention.
Figure 9:
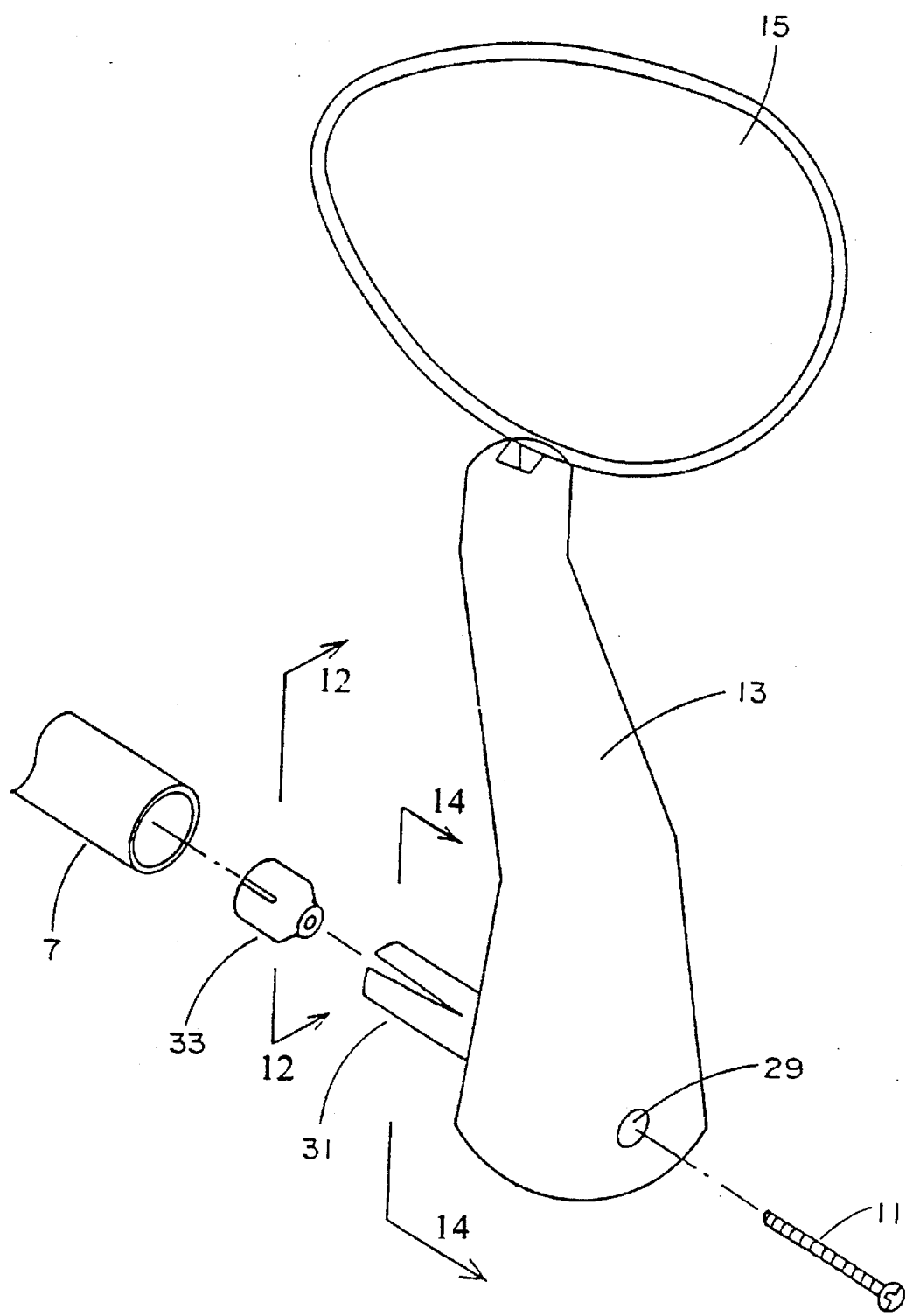
FIG. 9 shows how mirror 15 having stay portion 13 is mounted on handle bar 7 by a conventional mounting equipment.
Figure 10:
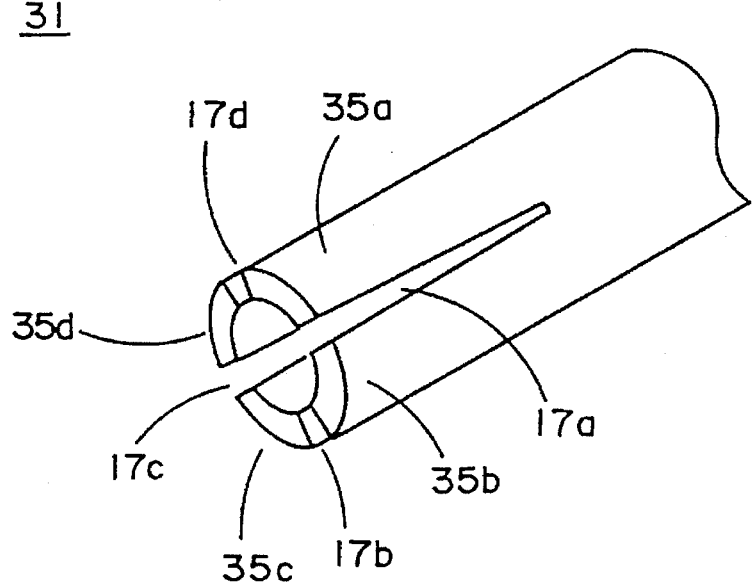
FIG. 10 is a perspective view showing the appearance of shaft 31 shown in FIG. 9.
Figure 11:
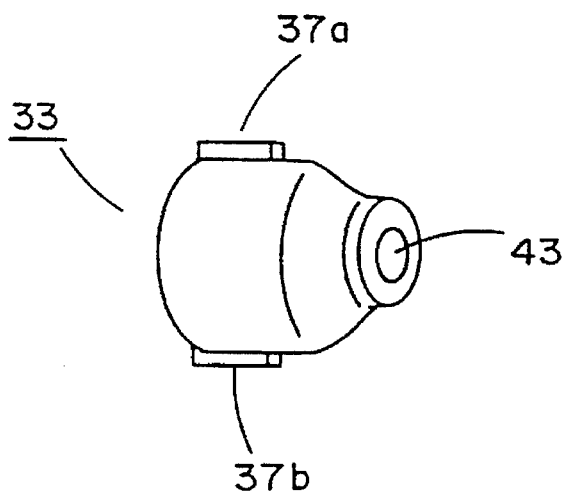
FIG. 11 is a perspective view showing appearance of tapered nut 33 shown in FIG. 9.
Figure 12:
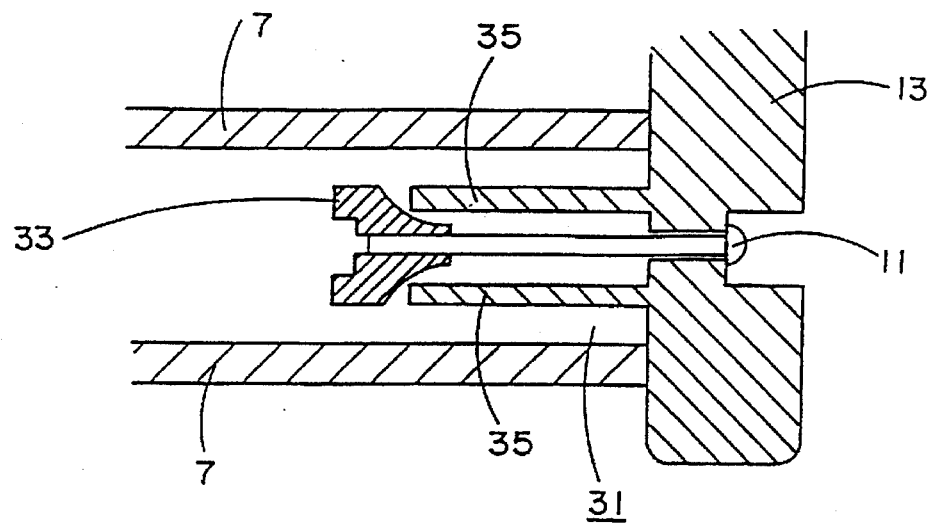
FIG. 12 is a cross sectional view taken along the line 12—13 with all parts of FIG. 9 engaged.
Figure 13:
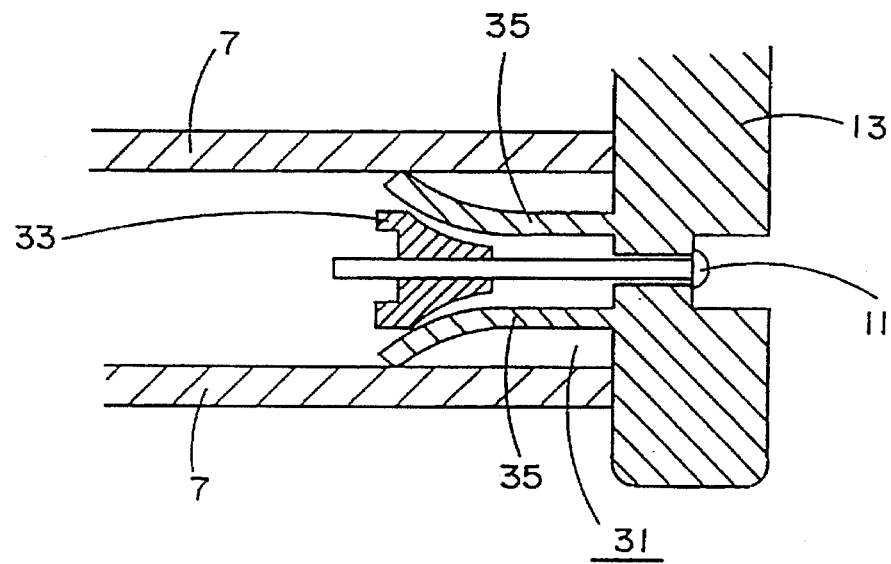
FIG. 13 is a cross sectional view taken along the line 12—12 showing a state in which mirror 15 having stay portion 13 is fixed on handle bar 7 by fastening the screw from the state of FIG. 12.
Figure 14:
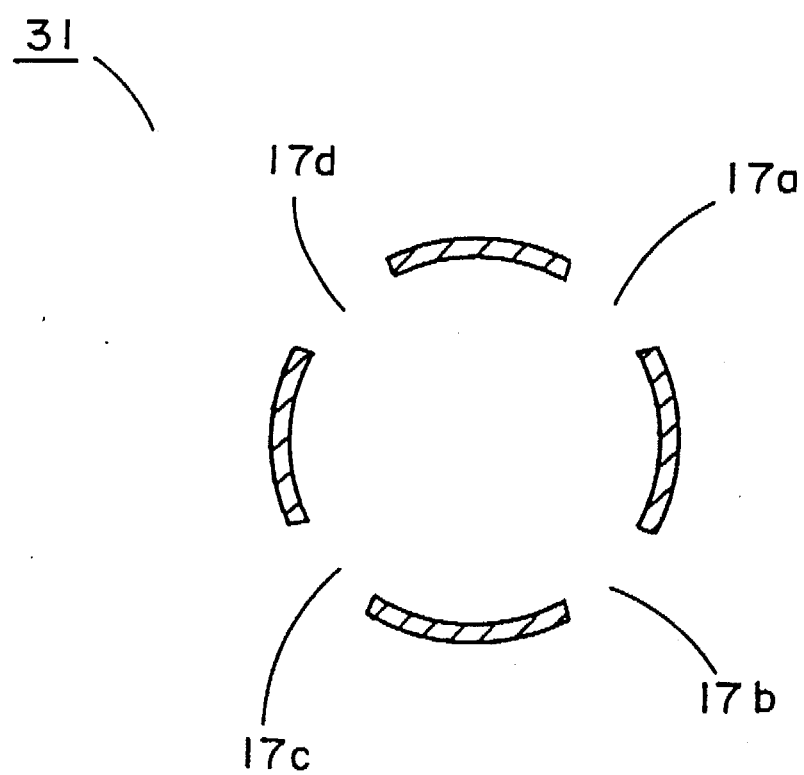
FIG. 14 is a cross sectional view taken along the line 14—14 of shaft 31 shown in FIG. 9.

FIG. 7 is a perspective view showing appearance of the expandable nut of the mounting equipment in accordance with a second embodiment of the present invention, and FIG. 8 is a perspective view showing appearance of the shaft portion of the mounting equipment in accordance with the second embodiment of the present invention.

Referring to FIGS. 7 and 8, in the mounting equipment in accordance with the present embodiment, hollow portion of expandable nut 3 is adapted to have rectangular cross section and correspondingly, shaft portion 5 to be fitted therein is also adapted to have rectangular cross section, so as to prevent idle turning of expandable nut 3 with respect to shaft portion 5.

Referring to FIG. 7, expandable nut 3 has plate portions 25a to 25d and slits 17a to 17d, and, referring to FIG. 8, shaft portion 5 has tapered portions 27a to 27d for pressing and expanding plate portions 25a to 25d of expandable nut 3.

As in the first embodiment, in the present embodiment, expandable nut 3 and shaft portion 5 are engaged by means of a screw through a tapped hole 29 of shaft portion 5 with a nut placed in nut fitting hole 21 provided at expandable nut 3, and the screw is fastened so as to draw expandable nut 3 and shaft portion 5 close to each other. Thus, plate portions 25a to 25d of expandable nut 3 are expanded, whereby an inner wall of the hollow portion having circular cross section existing at an end portion of the handle bar is brought into pressure contact with plate portions 25a to 25d. Thus, shaft portion 5 and expandable nut 3 are firmly fixed in the circular hole. When the screw is turned, plate portions 25a to 25d of expandable nut 3 are respectively engaged with tapered portions 27a to 27d of shaft portion 5 in plane, idle turning of expandable nut 3 is prevented when the screw is turned, and expandable nut 3 and shaft portion 5 are drawn close to each other.

In the embodiments above, a handle bar was shown as an example of the mount base component. However, the present invention may be applicable to any mount base component provided that it has a hollow portion of approximately circular cross section.

Further, the expandable nut and the shaft portion are drawn close to each other by means of a screw and a nut. However, any means capable of drawing these parts close to each other may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mounting equipment for mounting an object to a component having a hollow portion of approximately circular cross section on which an object is to be mounted, comprising:

first mounting part having a bar-shape to be connected to said object;

a second mounting part having a tip end portion of such a shape that covers at least an end portion of said first mounting part, engaged to said first mounting part such that said tip end portion expands conforming to an outer shape of said first mounting part as it is drawn closer to said first mounting part; and a drawing part capable of drawing said first and second mounting parts close to each other; wherein said first and second mounting parts being engaged with each other are inserted to said hollow portion of said component on which the object is to be mounted, and said drawing part is activated, whereby said tip end portion of said second mounting part is pressed against an inner wall of said hollow portion of said component on which the object is to be mounted.

2. The mounting equipment according to claim 1, wherein said second mounting part includes a slit.

3. The mounting equipment according to claim 2, wherein a portion sectioned by the slit of said second mounting part provides a plate portion, and thickness of said plate portion is made thinner toward that side which is to be engaged with said first mounting part.

4. The mounting equipment according to claim 2, wherein said first mounting part has a projecting portion which is engaged with said slit.

5. The mounting equipment according to claim 1, wherein said first mounting part includes a tapered portion tapered toward that side which is to be engaged with said second mounting portion.

6. The mounting equipment according to claim 1, wherein said component on which the object is to be mounted is a handle bar of a bicycle, and said object includes a mirror.

7. The mounting equipment according to claim 1, wherein said first and second mounting parts have rectangular cross sections.

* * * * *